(12) United States Patent
Szuba (10) Patent No.: US 7,261,664 B2
(45) Date of Patent: Aug. 28, 2007

(54) DIFFERENTIAL MECHANISM FOR A VEHICLE AND METHOD OF FORMING THE SAME

(75) Inventor: Joseph Szuba, Dearborn, MI (US)

(73) Assignee: Ronjo Company, LLC, Orion, MI (US)

( * ) Notice: Subject to any disclaimer, the term of this patent is extended or adjusted under 35 U.S.C. 154(b) by 185 days.

(21) Appl. No.: 11/210,992

(22) Filed: Aug. 24, 2005

(65) Prior Publication Data
US 2006/0063634 A1 Mar. 23, 2006

Related U.S. Application Data

(63) Continuation-in-part of application No. 10/729,397, filed on Dec. 5, 2003, now Pat. No. 6,945,898.

(51) Int. Cl.
*F16H 48/06* (2006.01)
*B21D 53/28* (2006.01)

(52) U.S. Cl. ..................... 475/230; 29/893.1
(58) Field of Classification Search ............. 29/893.1, 29/463, 434, 464, 525.03, 525.13; 475/230
See application file for complete search history.

(56) References Cited

U.S. PATENT DOCUMENTS

| 4,630,506 | A | | 12/1986 | Allmandinger et al. |
| 5,885,181 | A | | 3/1999 | Dissett |
| 6,061,907 | A | * | 5/2000 | Victoria et al. ............ 29/893.1 |
| 6,945,898 | B2 | * | 9/2005 | Szuba ........................ 475/230 |
| 2004/0060384 | A1 | | 4/2004 | Guo |

* cited by examiner

*Primary Examiner*—Dirk Wright
(74) *Attorney, Agent, or Firm*—Howard & Howard Attorneys, P.C.

(57) ABSTRACT

A differential mechanism includes a housing having a wall exposed to an open end and a pair of receptors defined in the wall. A lid is affixed to the open end forming an enclosure with the housing. The opposing gears are in driving engagement with one and the other and are disposed in the enclosure. A shaft is slidably disposed in the receptors extending through two of the opposing gears thereby supporting the opposing gears rotatable relative the housing. A retaining mechanism is defined between the shaft and at least one of the receptors forming a rigid connection therebetween to prevent movement of the shaft relative the housing.

70 Claims, 3 Drawing Sheets

DIFFERENTIAL MECHANISM FOR A VEHICLE AND METHOD OF FORMING THE SAME

CROSS REFERENCE TO RELATED APPLICATION

This application is a continuation in part application of the U.S. patent application Ser. No. 10/729,397 filed Dec. 5, 2003 now U.S. Pat. No. 6,945,898.

BACKGROUND OF THE INVENTION

1. Field of the Invention

This invention relates generally to a differential mechanism for use with a vehicle transmission.

2. Description of the Prior Art

In a typical automotive axle application, a differential case is supported within a differential housing. Differential gears interconnect a prop shaft of the vehicle to a vehicle transmission of a vehicle. The differential gears further connect axle shafts which extend from the differential housing to the rear wheels. Thus, power is transferred from the vehicle transmission, through the drive shaft, through the differential case, and to the wheels of the vehicle. Differential mechanisms are used in vehicle transmission to transmit torque from a transmission output to opposing axle shafts allowing right and left wheels to rotate at different speeds, particularly important when negotiating a turn.

While performing generally the same function, differential mechanisms have different dimensional requirements for rear wheel and front wheel drive vehicles. Specifically, differentials intended for use on the front wheel drive vehicles require a beveled, and even annular shape in order to compensate for both the smaller packaging area available and to account for the steering characteristics of the front wheels of the vehicle. The rear wheel drive vehicles are typically larger and require more torque production than front wheel drive vehicles and include sport utility, pick-ups, and even heavy duty vehicles. Therefore, the rear wheel drive differential is typically dimensioned larger with heavier gauge steel than is a front wheel drive differential.

Iron castings presently used to form the housing of a differential for the rear wheel drive vehicle requires a large number of machining operations to produce finished parts having the dimensions necessary to provide adequate tolerances to support the gears disposed within the housing. Dimensional accuracy is important to produce a vibration free motion of the differential in order to produce a smooth vehicle operation. Given the high torque requirements that is typical of the rear wheel drive vehicle, it is believed that the differential housing should include a more dimensionally stable and durable configuration than what is required of a front wheel drive differential housing. Furthermore, many of the manufacturing drawbacks of cast differential housings have resulted in excessive cost of the typical vehicle transmission.

The art is replete with various designs and methods of forming a differential housing using a cold flow-forming process taught by the U.S. Pat. No. 6,045,479 to Victoria et. al; U.S. Pat. No. 6,061,907 to Victoria et. al.; U.S. Pat. No. 6,176,152, and U.S. Pat. No. 6,379,277 to Victoria et. al. The U.S. Pat. No. 6,045,479 to Victoria et al, for example, teaches a housing for differential mechanism that is formed in two pieces using a cold flow-forming process. Each of the housing portions is formed with an internal hemispherical surface, and U-shaped recesses, which when aligned form circular recesses within which a pinion shaft is seated. A subassembly that includes the pinion shaft, pinion gears, side bevel gears, and a thin plastic liner surrounding the subassembly has to be aligned within the housing before an upper housing portion is inserted within the upper portion and welded. The opportunity remains for an improved alignment and meshing engagement between the pinion gears and the side bevel gears along with improved method of installation of the pinion and side bevel gears.

Alluding to the above, the prior art patents do not provide an improved meshing engagement between the gears as the gears are installed within the differential case. Therefore, there is a constant need in the area of a differential art for improved designs and methods of manufacturing the differential mechanisms that is durable, rigid, and which forms an improved alignment and meshing engagement between the pinion gears and the side bevel gears along with improved method of installation of the pinion and side bevel gears.

SUMMARY OF THE INVENTION

A differential mechanism includes a housing having a wall with an inner surface extending to a generally planar section. The wall defines an open end of the housing. Locally increasing the wall thickness is helpful toward strengthening and stiffening the housing as required by its operational loading and material properties as will be explained further below. The wall includes a first thickness of the wall and a second thickness defined at the generally planar section. The second thickness is greater than the first thickness with a pair of receptors disposed in the wall proximate the second thickness. The inner surface defines at least two receptors each rotatably engaging one terminal end of the shaft independent of and at spaced locations from the lid. At least one of the receptors defines a locking recess or groove. A retainer or snap-ring circumscribes the first annular groove and is engaged in the locking recess interconnecting the first annular groove aligned with the locking groove to hold the shaft within the housing forming a rigid connection and preventing axial movement of the shaft relative to the housing. A lid is attached to the open end forming an enclosure with the housing. Opposing side bevel gears are in driving engagement with pinion gears, each being disposed within the enclosure. The pinion gears are supported by a shaft. The shaft presents a first annular groove defined in one of the terminal ends of the shaft. A splined axle shaft includes opposing axial ends, each of which supports one of the side bevel gears. The invention includes a method of forming the differential mechanism.

Unlike differential housings formed from castings, the side bevel gears and the pinion gears are inserted mechanically and do not require manipulation into openings typically disposed in cast differential housings. In fact, unlike cast differential housings, each bevel pinion assembly is pre-assembled prior to insertion into the differential housing.

The advantage of the present invention is to provide an inventive differential mechanism having a housing that is significantly lighter than a cast housing portion while providing equivalent strength characteristics of the cast housing thereby enabling a reduction in the gauge of steel used to form the differential housing reducing the mass of the differential housing by up to 10 pounds.

Still another advantage of the present invention is to provide improved design and methods of manufacturing the differential mechanism, which forms an improved alignment and meshing engagement between the pinion gears and the side bevel gears.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
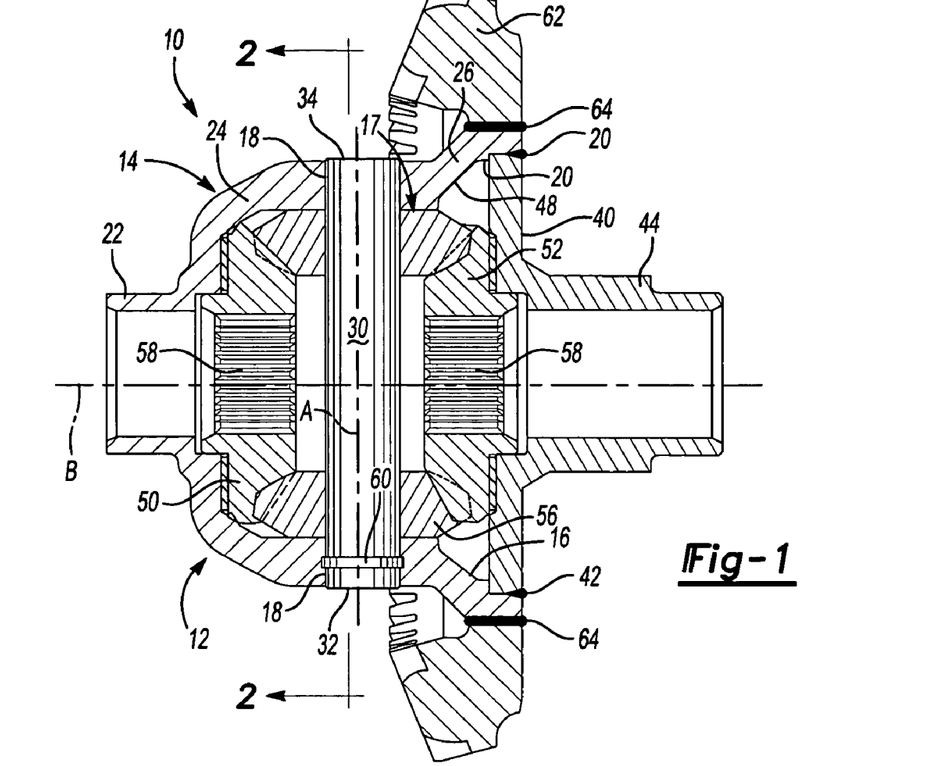
FIG. 1 shows a front cross sectional view of the inventive differential housing of the present application.

Referring to FIG. 1, a differential assembly of the present invention is generally shown at 10. A housing, generally shown at 12, includes a wall, generally indicated at 14. The wall 14 defines an inner surface 16. The inner surface 16 includes a generally planar section or surface, generally indicated at 17. At t least two receptors 18 diametrically disposed with respect to one another, are defined in the generally planar section 17. Alternatively, the inner surface 16 may include additional receptors (not shown). The wall 14 of the housing 12 defines an open end 20. The housing 12 defines a journal 22 at an opposite end of the housing 12 from the open end 20. The journal 22 may be formed apart from the housing 12 and then welded to the housing assembly, or may be formed integrally with the housing 12.

The housing 12 is formed by a spin-forming or flow-forming cold working operation that is particularly suited to produce bowl-shaped parts, and more particularly suited to form rotatably symmetrical parts. The housing 12 is formed over a chuck (not shown) by spinning rollers (not shown) that are profiled. The spin forming is an operation in which the material is plasticized by a combination of compression and tension forces applied to a workpiece by rollers. Flow-forming is an operation in which deformation is the result of compression force applied by the rollers to the housing. Preferably, the housing 12 is pre-stamped from a heavy gauge steel and includes a general configuration of the chuck, however, the housing 12 may be formed from a flat panel if necessary. With either process, precise dimensional tolerances can be maintained on the inner surface of a workpiece in which a net shape is produced with the additional step of machining the inner surface as is required of a cast housing. A near net forged or cast preform may also be used and the net shapes formed over the chuck in the same manner a detailed above.

During the forming operation, the housing 12 is plasticized which minimizes spring back and allows a high level of dimensional accuracy. The outer contour of the chuck is imprinted very precisely into the inner surface of the housing 12. The outer surface of the housing 12 is only free-formed by spinning rollers. Therefore, the outer surface may have a wavy shape, which does not adversely affect the operation of the differential assembly 10.

In the case of spin-forming in general there is no deliberate change in the wall thickness during the forming process. The starting workpiece is a sheet metal disc. Preferably, the sheet metal disc is not entirely bake-hardened in order to facilitate the formation of the housing 12. However, it may be desirable to bake-harden the surface of the sheet metal while not bake-hardening the inner thickness of the sheet metal.

Figure 2:
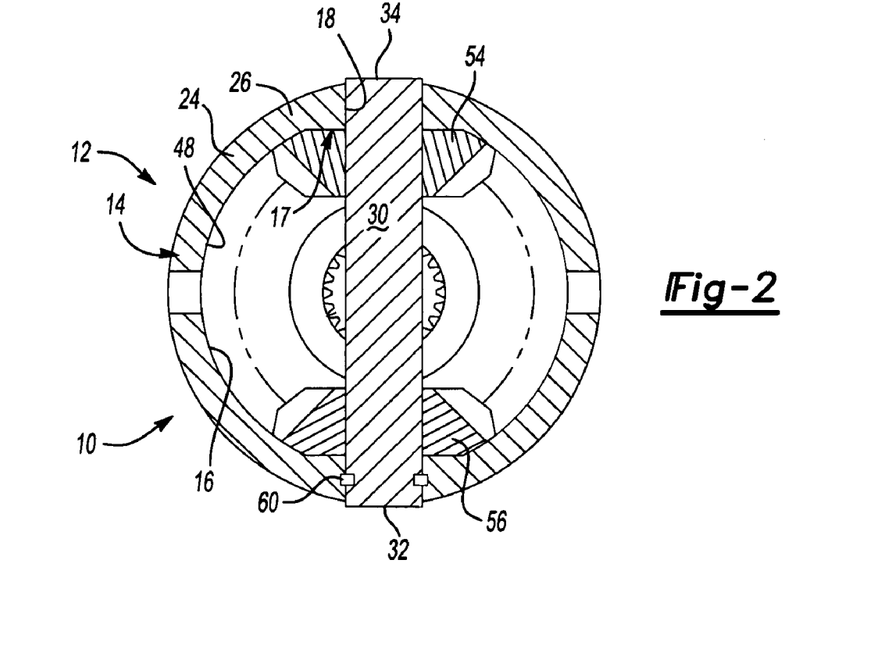
FIG. 2 shows a side cross sectional view of the inventive differential housing.

In the case of flow-forming, there is a deliberate change in the wall thickness of the housing 12 to that of the preformed part. Locally increasing the wall thickness is helpful toward strengthening and stiffening the housing 12 as required by its operational loading and material properties as will be explained further below. The wall 14 includes a first thickness 24 of the wall 14 and a second thickness 26 defined at the generally planar section 17. The second thickness 26 provides an extra strength to the housing 12. As best shown in FIGS. 1 and 2, the second thickness 26 is greater than the first thickness 24 with the receptors 18 disposed in the wall 14 proximate the second thickness 26. The generally planar section 17 is extended by the aforementioned flow-forming process annularly and substantially perpendicular to an axis A of a shaft 30 extending to terminal ends 32, 34 having at least one annular groove 36 defined at one of the terminal ends 32, as viewed in cross section shown in FIG. 2.

The starting housing stamping is typically a tube or cup, which is parallel sided or tapered. The preformed part is clamped against a spinning chuck, which is driven by a spindle. One or more spinning rollers apply radial force into the surface of the preform until the inner surfaces of the workpiece conforms to the external surfaces of the spinning chuck and acquires the required shape and dimensions. The process is known to produce excellent internal dimensional accuracy and internal surface finish while still being able to create integrated profiles and features such as, for example, the receptors 18 and a second groove 38, i.e. locking groove, defined in the wall 14 and exposed to at least one of the receptors 18. The locking groove 38 may present a U-shaped configuration. The rollers force the sheet metal inwardly toward the chuck, which includes projections that match the preferred dimension of the receptors thereby forming the receptors in the wall 14 of the housing 12. A chuck having collapsing inserts to form, for example, the receptors 18, is required to meet various design characteristics that protrude during the forming operation and retract into the chuck to remove the housing 12 from the chuck.

A lid 40, optionally formed as a stamping by a die press, is affixed to the open end 20 of the housing 12 via a laser weld bead 42. A welding laser follows a seam formed between the housing 12 and the lid 40 to secure the lid 40 to the housing 12. However, a removable attachment of the lid 40 to the housing 12 is also contemplated by the present invention. The lid 40 includes a lid journal 44 defining a common axis B with the housing journal 22. Each journal 22, 44 is sized to receive a splined shaft (not shown) that transfers motion to the vehicle wheels (not shown).

The housing 12 and the lid 40 define an enclosure 48 in which opposing gears, such as a pair of side beveled gears 50, 52 and a pair of pinion gears 54, 56 are disposed. The side bevel gears 50, 52 are in driving or meshing engagement with the pinion gears 54, 56. Each side beveled gear 50, 52 is supported by the splined axle shaft. Each side bevel gear 50, 52 includes splines 58 to receive the splined shaft and have a common axis with the housing journal 22 and the lid journal 44. The pinion gears 54, 56 are supported by the shaft 30 at each of the terminal ends 32, 34. Each terminal end 32, 34 is pivotally received by the receptor 18 thereby allowing the pinion gears 54, 56 to pivot upon the axis A.

Alluding to the above, a second shaft (not shown) is optionally inserted through, or otherwise affixed to, the shaft 30 in order to form a second pinion assembly in the enclosure perpendicular to the axis A. It is believed that the addition of the second pinion assembly provides a total of four pinion gears, which will produce 75% more torque than when only the shaft 30 with the pinion gears 54, 56 is utilized. To fixedly connect the housing 12 and the shaft 30, a snap ring 60 is disposed in the annular groove 36 defined in the shaft 30. When the shaft 30 having the pinion gears 54, 56 drivingly engaged with the side bevel gears 50, 52 is disposed in the enclosure 48 of the housing 12, the snap ring 60 extends into the locking groove 38 defined in the wall 14 thereby forming the rigid connection therebetween and preventing axial movement of the shaft 30 relative the housing 12.

A ring gear 62 is affixed to the open end 20 of the housing 12. The ring gear 62 is preferably attached to the housing 12 by laser-welding, which produces a ring gear laser weld bead 64 at the seam formed between the housing 12 and the ring gear 62. Preferably, the ring gear 62 overlays the laser weld beam formed at the seam between the lid 40 and the open end 20 of the housing 12.

Figure 3:
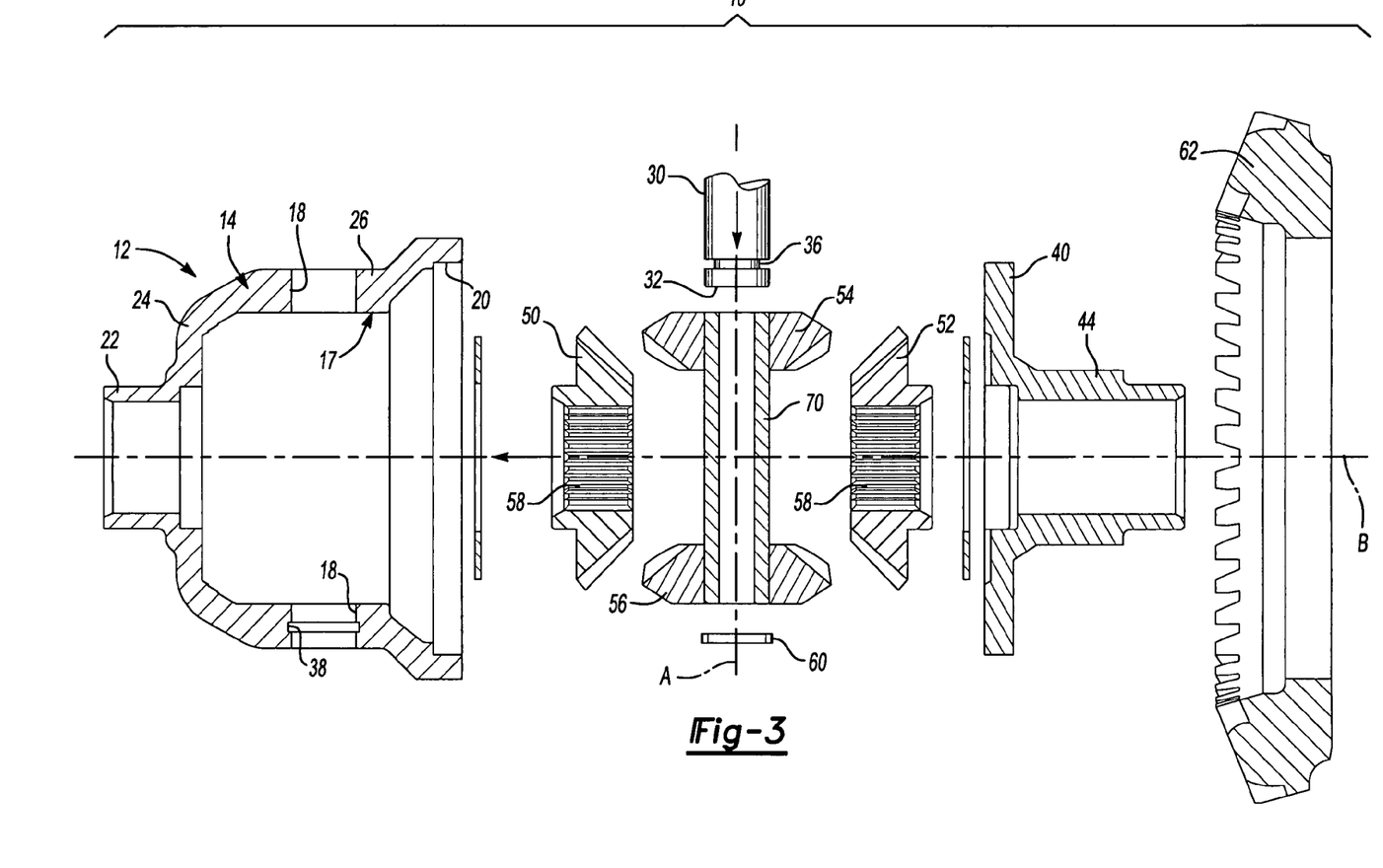
FIG. 3 is an exploded view of the inventive differential housing.
Figure 4:
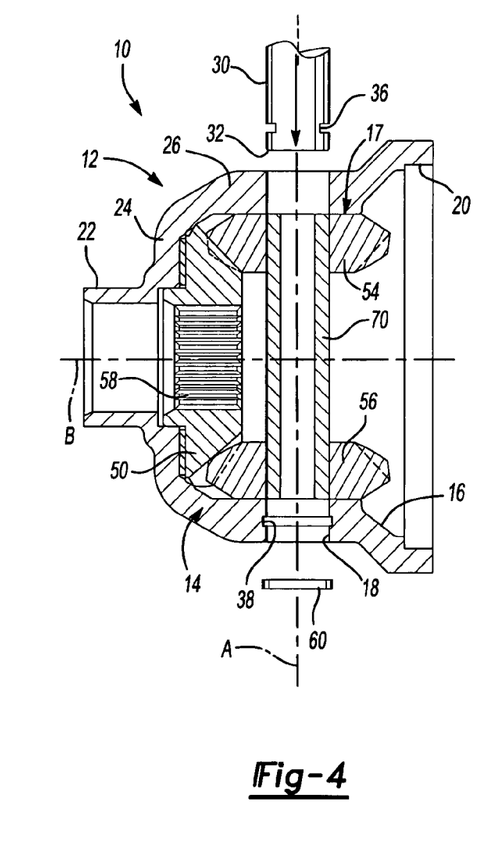
FIG. 4 shows a first step of the method of forming the inventive differential housing illustrating pinion gears supported by a tubular retained disposed in side the inventive differential housing and a shaft adjacent the inventive differential housing.
Figure 5:
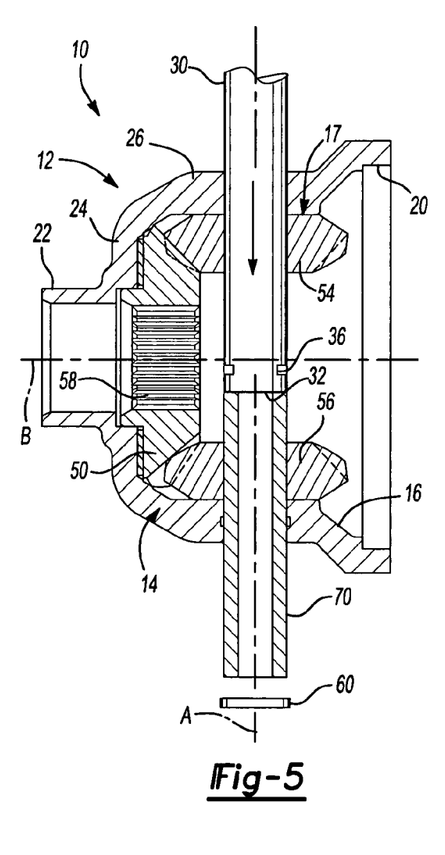
FIG. 5 shown another step of the method, wherein the shaft is slidably disposed through the inventive differential housing and one of the pinion gears thereby forcing the tubular retainer out of the inventive differential housing.
Figure 6:
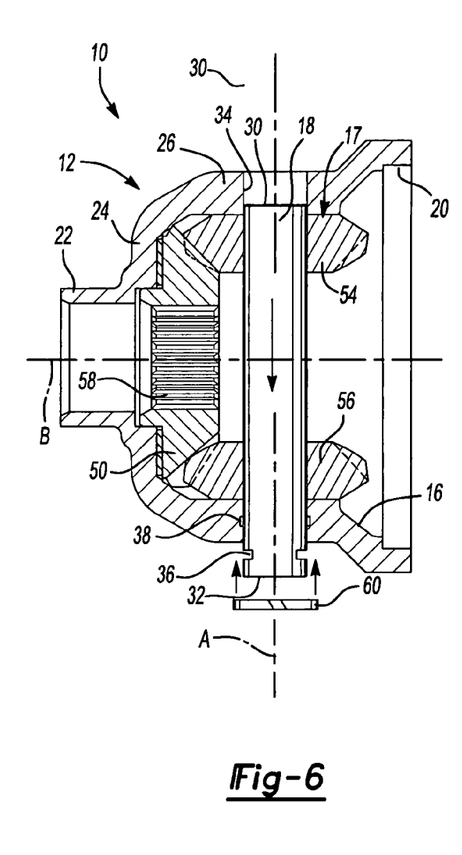
FIG. 6 shows still another step of the method illustrating the shaft disposed in the inventive differential housing and supporting the pinion gears and a snap-ring adjacent the shaft.

FIG. 3 shows an exploded view of the inventive differential assembly 10 during the assembly process and FIGS. 4 through 6 illustrate the steps of the method of assembling the inventive differential assembly 10. To form an improved alignment and meshing engagement between the pinion gears 54, 56 and the side bevel gears 50, 52, the pinion gears 54, 56 are supported by a tubular member 70. The tubular member has a diameter smaller than the diameter of the receptors 18. As best illustrated in FIGS. 4 through 6, one of the side bevel gears 50 is inserted into the housing 12 aligning the splines 58 with the splines of the splined axle shaft. Once the side bevel gear 50 is in place, the pinion gears 54, 56 supported by the tubular member 70 are inserted into the housing 12. After the pinion gears 54, 56 are inserted into the housing 12, the second side bevel gear 52 is inserted into the housing 12 in driving engagement with the pinion gears 54, 56. Once all the gears 50, 52, 54, and 56 are in place, the lid 40 is placed over the open end 20 of the housing 12. The seam formed between the housing 12 and the lid 40 is preferably laser-welded securing the lid 40 to the housing 12. Other methods of securing the lid 40 to the housing 12 may also be used.

Once the lid 40 is secured to the housing 12, the shaft 30 is slidably inserted through one of the receptors 18 and then through one of the pinion gears 54 thereby forcing the tubular member 70 out of the housing 12. Alternatively, the shaft 30 is inserted before the lid 40 is secured to the housing 12. During this process the shaft 30 is in a contact with the tubular member 70 to maintain proper and constant alignment between the gears 50, 52, 54, and 56. As the tubular member 70 is replaced with the shaft 30, the snap-ring 60 is disposed about the annular groove 36 defined in the shaft 30, as the shaft 30 partially extended beyond the wall 14 of the housing 12. The shaft 30 is then retracted back to the housing 12 with the snap-ring 60 that circumscribes the annular groove 36 extending into the locking groove 38 as the annular groove 36 is aligned with the locking groove 38 thereby holding the shaft 30 within the housing 12 to form the rigid connection therebetween.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A differential assembly comprising;
  a housing having a wall exposed to an open end with said wall defining opposing receptors,
  a lid attachable to said open end forming an enclosure with said housing,
  a plurality of opposing gears disposed in said enclosure presenting a meshing engagement therebetween,
  a shaft device received by said opposing receptors and extending through at least two of said opposing gears thereby rotatably supporting said opposing gears relative to said housing, and
  said wall defining a continuous inner surface having a generally planar section proximate said opposing receptors and extending perpendicular said shaft device disposed in said opposing receptors thereby forming a rigid connection between said generally planar wall and said shaft device.

2. An assembly as set forth in claim 1, wherein said shaft device is further defined by a first shaft extending along an axis intersecting said generally planar section as viewed in cross section.

3. An assembly as set forth in claim 1, wherein said wall includes a first thickness and a second thickness greater than said first thickness.

4. An assembly as set forth in claim 3, wherein said generally planar section includes said second thickness with said opposing receptors disposed in said second thickness proximate said open end.

5. An assembly as set forth in claim 2, wherein said shaft device is further defined by a second shaft intersecting said first shaft with each of said first and second shafts extending to terminal ends.

6. An assembly as set forth in claim 2, including a retaining mechanism defined between at least one of the opposing receptors and said first shaft.

7. An assembly as set forth in claim 6, wherein said retaining mechanism is further defined by said first shaft presenting a first groove defined at one of said terminal ends.

8. An assembly as set forth in claim 7, wherein said retaining mechanism is further defined by a second groove defined in said wall and exposed to one of said opposing receptors.

9. An assembly as set forth in claim 8, wherein said second groove presents a U-shaped configuration.

10. An assembly as set forth in claim 9, wherein said retaining mechanism is further defined by a snap-ring circumscribing said first groove and extending into said second groove as said first groove is aligned with said second groove thereby holding said first shaft within said housing to form said rigid connection therebetween.

11. A differential assembly comprising;
a housing having a wall extending to an inner surface exposed to an open end with said wall defining at least two receptors,
a lid attached to said open end forming an enclosure with said housing,
a plurality of opposing gears disposed in said enclosure presenting driving engagement therebetween,
a shaft extending along an axis and presenting terminal ends each received by one of said receptors and pivotally supporting at least two of said opposing gears rotatable relative said housing wherein at least one of said terminal ends defines a first groove,
a snap-ring received by said first groove, and
at least one of said receptors defining a second groove for engaging said snap-ring as said first groove is aligned with said second groove to hold said shaft within said housing thereby preventing axial movement of said shaft relative said housing.

12. An assembly as set forth in claim 11, wherein said second groove is U-shaped.

13. An assembly as set forth in claim 12, wherein said opposing gears are further defined by a pair of side beveled gears and a pair of pinion gears.

14. An assembly as set forth in claim 13, wherein said wall defines a generally planar section proximate said open end and said receptors with said generally planar section extending perpendicular said shaft disposed in said receptors.

15. An assembly as set forth in claim 14, wherein said wall includes a first thickness and a second thickness greater than said first thickness.

16. An assembly as set forth in claim 15, wherein said generally planar section includes said second thickness with said receptors disposed in said second thickness proximate said open end.

17. An assembly as set forth in claim 16, wherein said lid defines a lid splined shaft opening and said housing defines a housing splined shaft opening, said splined shaft openings having a common axis.

18. An assembly as set forth in claim 17, including a splined shaft supporting each of said side beveled gears and extending through said lid splined shaft opening and said housing splined shaft opening.

19. A differential assembly comprising;
a housing having a wall extending to an inner surface exposed to an open end with said wall defining at least two receptors,
a plurality of opposing gears disposed in said housing and presenting driving engagement therebetween,
a shaft presenting terminal ends received by said at least two receptors extending through and pivotally supporting at least two of said opposing gears rotatable relative said housing wherein at least one of said terminal ends presents a first groove defined therein,
a snap-ring received by said first groove, and
said wall presenting a first thickness and a second thickness greater than said first thickness with said receptors being disposed in said wall proximate said second thickness with one of said receptors presenting a second groove defined in said second thickness for engaging said snap-ring as said first groove is aligned with said second groove to hold said shaft device within said housing thereby preventing axial movement of said shaft relative said housing.

20. A differential assembly as set forth in claim 19, wherein said wall defines a generally planar section proximate said open end and said receptors with said generally planar section extending perpendicular said shaft disposed in said receptors.

21. A differential assembly as set forth in claim 20, wherein said generally planar section includes said second thickness with said receptors disposed in said second thickness proximate said open end.

22. A differential assembly as set forth in claim 21, wherein said inner surface of said wall at said second thickness extends annularly and substantially perpendicular to said shaft as viewed in cross section.

23. A differential assembly as set forth in claim 22, wherein said second groove is U-shaped.

24. A differential assembly as set forth in claim 19, wherein said opposing gears are further defined by a pair of side beveled gears and a pair of pinion gears.

25. A differential assembly as set forth in claim 19, including a lid attached to said open end.

26. A differential assembly as set forth in claim 25, wherein said lid defines a lid splined shaft opening and said housing defines a housing splined shaft opening, said splined shaft openings having a common axis.

27. A differential assembly as set forth in claim 26, including a splined shaft supporting each of said side beveled gears and extending through said lid splined shaft opening and said housing splined shaft opening.

28. A differential assembly comprising;
a housing having a wall defining an inner surface exposed to an open end with said wall presenting at least two receptors defined therein,
a lid fixedly attached to said open end forming an enclosure with said housing,
a plurality of opposing gears disposed in said enclosure presenting a meshing engagement therebetween,
a shaft device disposed in said at least two receptors and extending through at least two of said opposing gears thereby supporting said opposing gears rotatable relative said housing, and
a retaining mechanism disposed between and interconnecting said shaft device and at least one of said receptors for preventing axial movement of said shaft device relative said housing.

29. An assembly as set forth in claim 28, wherein said shaft device is further defined by a first shaft extending along an axis.

30. An assembly as set forth in claim 29, wherein said shaft device is further defined by a second shaft intersecting said first shaft with each of said first and second shafts extending to terminal ends.

31. An assembly as set forth in claim 30, wherein said retaining mechanism is further defined by said first shaft presenting a first groove defined at one of said terminal ends.

32. An assembly as set forth in claim 31, wherein said retaining mechanism is further defined by a second groove defined in said wall and exposed to one of said receptors.

33. An assembly as set forth in claim 32, wherein said second groove presents a U-shaped configuration.

34. An assembly as set forth in claim 33, wherein said retaining mechanism is further defined by a snap-ring circumscribing said first groove and extending into said second groove as said first groove is aligned with said second groove thereby holding said first shaft within said housing to form said rigid connection therebetween.

35. An assembly as set forth in claim 28, wherein said opposing gears are further defined by a pair of side beveled gears and a pair of pinion gears supported on said first shaft.

36. An assembly as set forth in claim 28, wherein said wall defines a generally planar section proximate said open end and said receptors with said generally planar section extending perpendicular said shaft device disposed in said receptors thereby forming a rigid connection between said generally planar wall and said shaft device.

37. An assembly as set forth in claim 36, wherein said wall includes a first thickness and a second thickness greater than said first thickness.

38. An assembly as set forth in claim 37, wherein said generally planar section includes said second thickness with said opposing receptors disposed in said second thickness proximate said open end.

39. An assembly as set forth in claim 28, wherein said lid defines a lid splined shaft opening and said housing defines a housing splined shaft opening, said splined shaft openings having a common axis.

40. An assembly as set forth in claim 39, including a splined shaft supporting each of said side beveled gears and extending through said lid splined shaft opening and said housing splined shaft opening.

41. An assembly as set forth in claim 39, wherein said lid defines a first seam with said housing, said first seam being sealed with a first laser weld bead.

42. An assembly as set forth in claim 41, further including a ring gear circumscribing said housing.

43. An assembly as set forth in claim 42, including a second seam defined between with said housing and said ring gear, said second seam being sealed with a second laser weld bead.

44. A method of making a differential mechanism, said method comprising the steps of:
    placing a housing preform having an inner surface and at least one open end over a spinning chuck having a plurality of projections;
    cold-working the housing preform by at least one of spin-forming and flow-forming a wall having an inner surface of the housing preform over the chuck;
    forming a plurality of projections disposed in the chuck thereby forming at least two receptors defined in the wall at locations spaced from the open end;
    inserting a plurality of opposing gears presenting a meshing engagement therebetween and supported by at least one tubular member into the housing;
    fixedly attaching a lid to the open end to form an enclosure to confine the plurality of the opposing gears inside the housing; and
    inserting a shaft through at least one of the receptors and pushing the at least one tubular member away from the housing thereby maintaining a contact between the shaft and the at least one tubular member to maintain the meshing engagement between the opposing gears;
    rigidly interconnecting the shaft within at least one of the receptors to prevent axial movement of the shaft relative the housing.

45. The method as set forth in claim 44, further including the step of forming said lid with a die press.

46. The method as set forth in claim 45, wherein said step of fixedly attaching the lid is further defined by laser welding the lid to the housing.

47. The method as set forth in claim 46, further including the step of forming a first groove at one of the terminal ends of the shaft.

48. The method as set forth in claim 47, further including the step of forming a second groove in the wall exposed to one of the receptors.

49. The method as set forth in claim 48, further including the step of disposing a snap ring in the first annular groove as the shaft partially extends beyond the housing.

50. The method as set forth in claim 49, further including the step of reversibly sliding the shaft into the housing to engage the snap-ring in the second annular groove to rigidly interconnect the shaft with the housing.

51. The method as set forth in claim 44, wherein the step of flow-forming the wall of the housing is further defined by increasing a thickness of the wall from a first thickness to a second thickness with the receptors being disposed in the wall proximate the second thickness.

52. The method as set forth in claim 51, wherein the step of increasing the thickness is further defined by flow-forming the inner surface of the wall at the second thickness to extend annularly and substantially perpendicular to the shaft as viewed in cross section.

53. The method as set forth in claim 44, wherein the step of inserting the opposing gears is further defined by meshingly engaging a pair of side beveled gears and a pair of pinion gears supported on the tubular member.

54. The method as set forth in claim 45, wherein the step of forming the lid is further defined by forming a lid splined shaft opening.

55. The method as set forth in claim 54, wherein the step of flow-forming the wall of the housing is further defined by forming a housing splined shaft opening having a common axis with the splined shaft opening.

56. The method as set forth in claim 55, further including the step of inserting a splined shaft through the lid splined shaft opening and the housing splined shaft opening to support each of the side beveled gears.

57. A method of making a differential mechanism, said method comprising the steps of:
    placing a housing preform having an inner surface and at least one open end over a spinning chuck having a plurality of projections;
    cold-working the housing preform by at least one of spin-forming and flow-forming a wall having an inner surface of the housing preform over the chuck; and
    forming a generally planar section of the wall proximate said open end by flow-forming the wall to define a first thickness extending to a second thickness at the generally planar section being greater than the first thickness.

58. The method as set forth in claim 57 further including the step of forming a plurality of projections disposed in the chuck thereby forming at least two receptors defined in the wall at locations spaced from the open end.

59. The method as set forth in claim 58 including the step of inserting a plurality of opposing gears presenting a meshing engagement therebetween and supported by at least one tubular member into the housing.

60. The method as set forth in claim 58 including the step of fixedly attaching a lid to the open end to form an enclosure to confine the plurality of the opposing gears inside the housing.

61. The method as set forth in claim 58 including the step of inserting a shaft through at least one of the receptors and pushing the at least one tubular member away from the housing thereby maintaining a contact between the shaft and the at least one tubular member to maintain the meshing engagement between the opposing gears.

62. The method as set forth in claim 58 including the step of rigidly interconnecting the shaft within at least one of the receptors to prevent axial movement of the shaft relative the housing.

63. The method as set forth in claim 62, further including the step of forming a first groove at one of the terminal ends of the shaft.

64. The method as set forth in claim 63, further including the step of forming a second groove in the wall exposed to one of the receptors.

65. The method as set forth in claim 64, further including the step of disposing a snap ring in the first annular groove as the shaft partially extends beyond the housing.

66. The method as set forth in claim 65, further including the step of reversibly sliding the shaft into the housing to engage the snap-ring in the second annular groove to rigidly interconnect the housing.

67. The method as set forth in claim 58, wherein the step of inserting the opposing gears is further defined by meshingly engaging a pair of side beveled gears and a pair of pinion gears supported on the tubular member.

68. A housing for engaging a differential assembly having a plurality of opposing gears and a shaft supported by said housing and engaging the opposing gears rotatable relative to said housing, said housing comprising:

a wall having a first thickness and an inner surface exposed to an open end with said wall defining opposing receptors for engaging the shaft;

a lid attachable to said open end forming an enclosure with said housing; and said wall defining a generally planar section proximate said open end and said opposing receptors with said generally planar section having a second thickness.

69. A housing as set forth in claim 68, wherein said second thickness is greater than said first thickness.

70. A housing as set forth in claim 69, wherein said opposing receptors are defined disposed in said second thickness proximate said open end.

* * * * *

UNITED STATES PATENT AND TRADEMARK OFFICE
CERTIFICATE OF CORRECTION

PATENT NO. : 7,261,664 B2  
APPLICATION NO. : 11/210992  
DATED : August 28, 2007  
INVENTOR(S) : Joseph Szuba Page 1 of 1

It is certified that error appears in the above-identified patent and that said Letters Patent is hereby corrected as shown below:

Column 11, line 13, please insert --the shaft with-- between the words "interconnect" and "the."

Signed and Sealed this

Sixth Day of May, 2008

JON W. DUDAS  
*Director of the United States Patent and Trademark Office*